(12) United States Patent
Kimura et al.

(10) Patent No.: US 7,377,192 B2
(45) Date of Patent: May 27, 2008

(54) CONTROLLER FOR VEHICLE-MOUNTED COMPONENT

(75) Inventors: Kiyoshi Kimura, Obu (JP); Masashi Hori, Anjo (JP); Haruki Matsuzaki, Obu (JP)

(73) Assignees: Denso Corporation, Kariya, Aichi-pref. (JP); Nippon Soken, Inc., Nishio, Aichi-pref. (JP)

( * ) Notice: Subject to any disclaimer, the term of this patent is extended or adjusted under 35 U.S.C. 154(b) by 256 days.

(21) Appl. No.: 11/404,008

(22) Filed: Apr. 14, 2006

(65) Prior Publication Data

US 2006/0232393 A1    Oct. 19, 2006

(30) Foreign Application Priority Data

Apr. 15, 2005    (JP)    ............................. 2005-118749

(51) Int. Cl.
    *F16H 59/00*    (2006.01)
(52) U.S. Cl. ........................................................ 74/335
(58) Field of Classification Search ................... 74/335
    See application file for complete search history.

(56) References Cited

U.S. PATENT DOCUMENTS 6,877,390 B2 *  4/2005  Tsuzuki et al. ............... 74/335
7,137,475 B2 * 11/2006  Shiomi et al. ............... 180/315
7,190,138 B2 *  3/2007  Kamio et al. ................ 318/445
7,245,225 B2 *  7/2007  Kamio et al. ................ 340/648

FOREIGN PATENT DOCUMENTS

JP    2002-323127         11/2002
JP    2003252074 A *       9/2003

* cited by examiner

*Primary Examiner*—Ha D. Ho
(74) *Attorney, Agent, or Firm*—Nixon & Vanderhye P.C.

(57) ABSTRACT

In a controller for a vehicle-mounted component, a shift position detector that detects an effective shift position of an automatic transmission. A shift position switching unit switches the effective shift position of the automatic transmission. A parking switching unit mechanically locks the output shaft of the automatic transmission when the effective shift position in a parking position. A shift position switching controller, which is not energized when the engine is stopped, controls the shift position switching unit. A memory device memorizes the effective shift position at a timing when the shift position switching controller stops being energized. A vehicle-mounted component controller prohibits an operation of a vehicle-mounted component when the effective shift position in the memory device is not in the parking position while the current supply to the shift position switching controller is stopped.

5 Claims, 15 Drawing Sheets

REVERSE

FORWARD

CONTROLLER FOR VEHICLE-MOUNTED COMPONENT

CROSS REFERENCE TO RELATED APPLICATION

This application is based upon and claims the benefit of priority of Japanese Patent Application No. 2005-118749 filed on Apr. 15, 2005, the content of which is incorporated herein by reference.

FIELD OF THE INVENTION

The present invention relates to a controller for a vehicle-mounted component such as a door lock, an electric slide door, a trunk lid, a power tailgate, a fuel filler lid, etc., which can improve safety performance of a vehicle.

BACKGROUND OF THE INVENTION

It is desirable that vehicle-mounted components such as vehicle doors are operated only when the vehicle is securely parked, even while an engine o the vehicle is stopped. In order to allow the operation of the vehicle-mounted components only when an effective shift position is in a parking position in the vehicle with an automatic transmission, it is necessary to keep supplying electricity to an actuator controller for controlling an actuator even while the vehicle is parked and the engine is stopped. This is to detect the effective shift position driven by the actuator at all times via the actuator controller. In this regard, the parking position is a shift position in which there is no transmission between an input side and an output side of the automatic transmission and an output shaft of the automatic transmission is mechanically locked.

A capacitance of a vehicle-mounted battery is limited. Thus, it is desirable to detect the effective shift position without consuming electricity at all or with small electricity consumption while the vehicle is parked, to prevent the battery from running out.

The controller for a vehicle-mounted component has an automatic transmission, a shift position detector, a shift position switching unit, a parking switching unit, a shift position switching controller, a memory device and a vehicle-mounted component controller. The automatic transmission reduces a rotation of an engine and outputs the rotation at an output shaft. The shift position detector detects an effective shift position of the automatic transmission. The shift position switching unit switches the effective shift position of the automatic transmission. The parking switching unit mechanically locks the output shaft of the automatic transmission when the shift position switching unit switches the effective shift position in a parking position. The shift position switching controller controls the shift position switching unit. The current supply to the shift position switching controller is substantially stopped when the engine is stopped. The memory device memorizes the effective shift position at a timing when the shift position switching controller stops being energized. The vehicle-mounted component controller prohibits an operation of a vehicle-mounted component when the effective shift position memorized in the memory device is not in the parking position while the current supply to the shift position switching controller is stopped.

SUMMARY OF THE INVENTION

The present invention is achieved in view of the above-described issues, and has an object to provide a controller for vehicle-mounted component that can allow an operation of a vehicle-mounted component only when an effective shift position of an automatic transmission is in a parking position without consuming electricity at all or with small electricity consumption even while an engine of the vehicle is stopped, by using a construction of the automatic transmission that keeps the effective shift position while a current supply to an actuator controller of an actuator of the automatic transmission is stopped.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

First Embodiment

Figure 1:
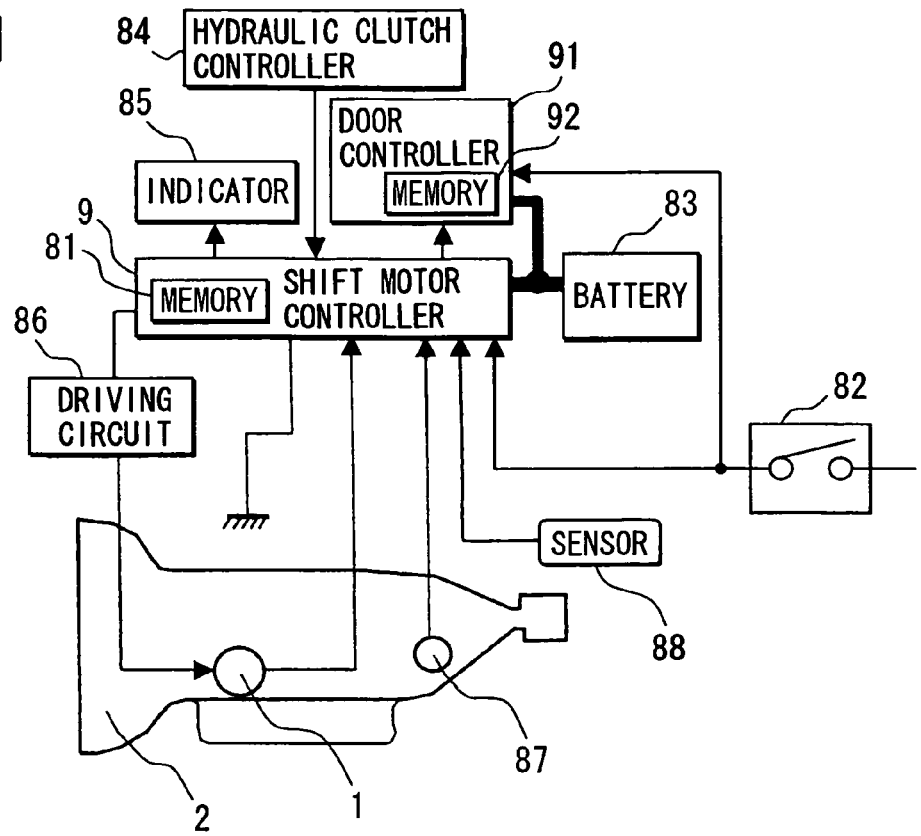
FIG. 1 is a block diagram showing a construction of a controller according to a first embodiment of the present invention.

A controller according to a first embodiment of the present invention is described in the following, referring to FIGS. 1 to 19. Firstly, a shift position switching unit of the controller is described in the following. The shift position switching unit switches a switching a shift position switching mechanism 3 and a parking switching mechanism 4 (refer to FIG. 4) which are incorporated in an automatic transmission 2 (refer to FIG. 1) of a vehicle by using an actuator 1 (refer to FIG. 1). The actuator 1 is a servo mechanism that actuates the shift position switching mechanism 3. The actuator 1 includes a synchronous electric motor 5, reduction gears 6 that decelerate a rotational speed of the electric motor 5 to drive the shift position switching mechanism 3, an encoder 7 that detects a rotational angle of the electric motor 5, an output angle detector 8 that detects an output angle of the reduction gears 6, that is, an output angle of an output shaft 17 or an effective shift position, which are described below. The output angle detector 8 is an example of the angle detector and a shift position detector according to the present invention. A motor controller 9 controls a rotation of the electric motor 5, which drives the shift position switching mechanism 3 via the reduction gears 6.

That is, in the shift position switching unit, the motor controller 9 controls a rotational direction, the rotational speed, a number of revolutions and the rotational angle of the electric motor 5, to switch the shift position switching mechanism 3 and the parking switching mechanism 4 via the reduction gears 6. The shift position switching unit switches the effective shift position of the automatic transmission 2 and a parking lock, i.e., a lock of an output shaft of the automatic transmission 2.

Figure 3:
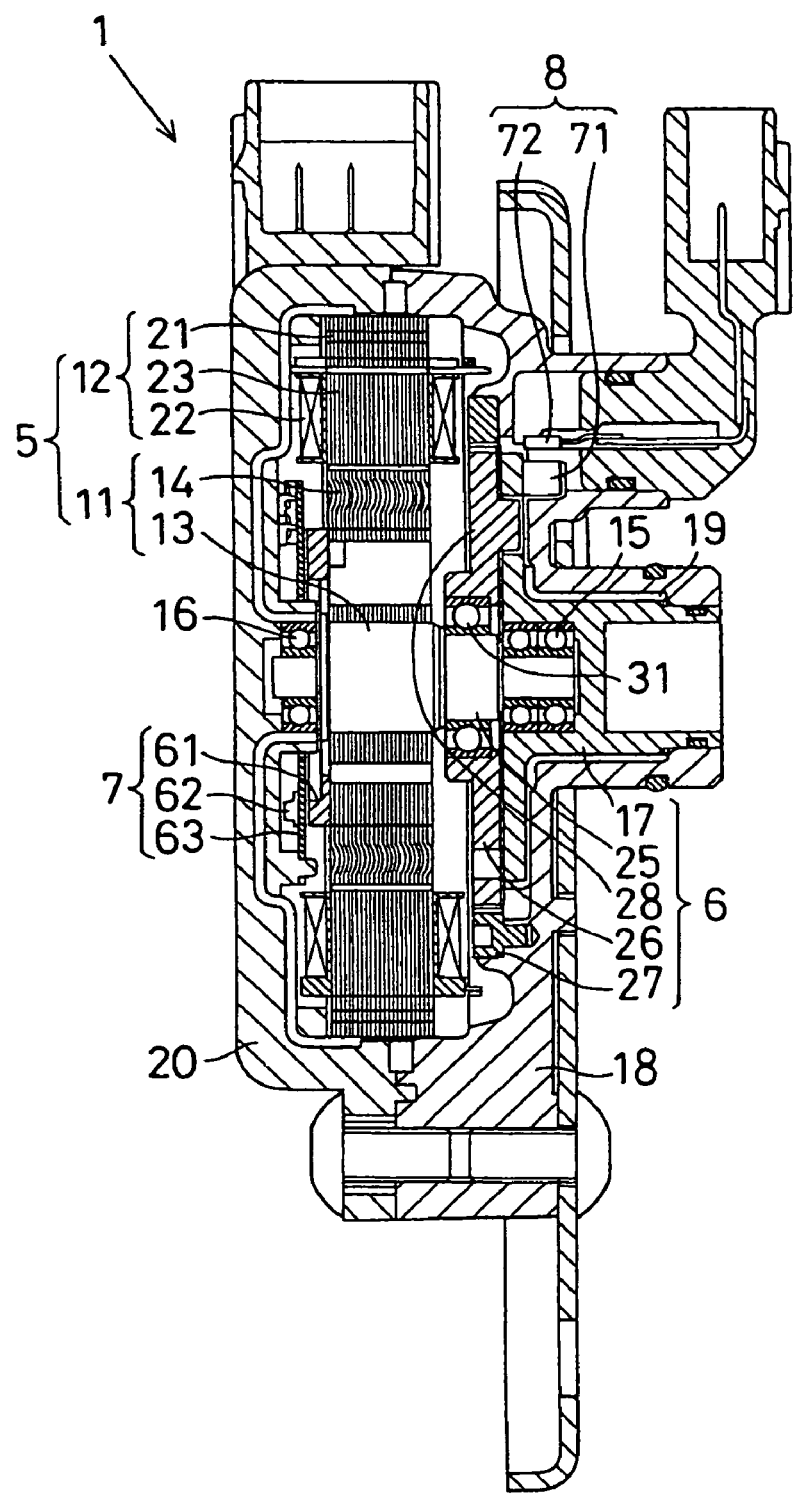
FIG. 3 is a cross-sectional view showing a shift position switching unit of the controller according to the first embodiment.

Right in FIG. 3 is referred to as front, and left in FIG. 3 is referred to as rear in the following.

Figure 5:
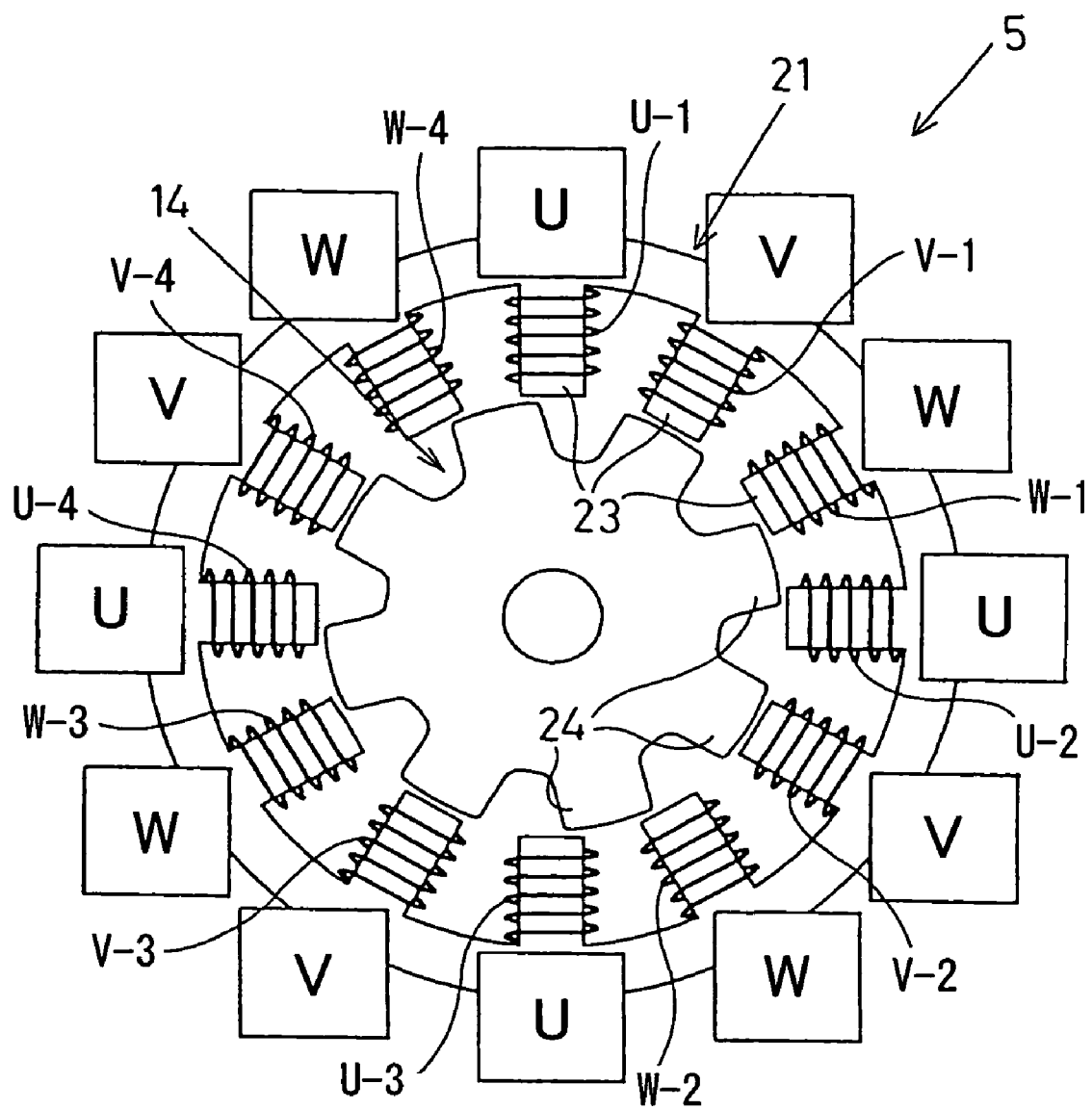
FIG. 5 is a schematic diagram showing an electric motor of the controller according to the first embodiment.

The electric motor 5 is described in detail in the following, referring to FIGS. 3 and 5. The electric motor 5 is a blushless switched reluctance motor (SR motor), which has no permanent magnet. The electric motor 5 includes a rotor 11, which is rotatably supported, and a stator 12, which is arranged coaxially to a rotation center of the rotor 11.

The rotor 11 includes a rotor shaft 13 and a rotor core 14. The rotor shaft 13 is rotatably supported by anti-friction bearings, i.e., a front anti-friction bearing 15 and a rear anti-friction bearing 16. The front anti-friction bearing 15 is provided at a front end of the rotor shaft 13, and the rear anti-friction bearing 16 is provided at a rear end of the rotor shaft 13.

The front anti-friction bearing 15 is fitted to and fixed on an inner circumferential face of an output shaft 17 of the reduction gears 6. The output shaft 17 of the reduction gears 6 is rotatably supported by a metal bearing 19, which is arranged on an inner circumference of a front housing 18. Specifically, the front end of the rotor shaft 13 is rotatably supported via the front anti-friction bearing 15 and the output shaft 17 by the metal bearing 19. The rear anti-friction bearing 16 is press-fitted to and fixed on an outer circumference of the rear end of the rotor shaft 13, and is supported by a rear housing 20.

The stator 12 includes a fixed stator core 21 and a multi-phase exciting coils 22 that generates a magnetic field when energized. The stator core 21 is formed by stacking a number of thin plates, and fixed to the rear housing 20. The stator core 21 is provided with a stator teeth 23, which are introverted salient poles protruding radially inward to the rotor core 14 at every 30 degrees in a rotational direction of the electric motor 5. Coils U, V and W (U-phase coils U-1, U-2, U-3 and U-4, V-phase coils V-1, V-2, V-3 and V-4 and W-phase coils W-1m W-2, W-3 and W-4) are respectively wound on the stator teeth 23 to generate magnetic force.

Figure 6:
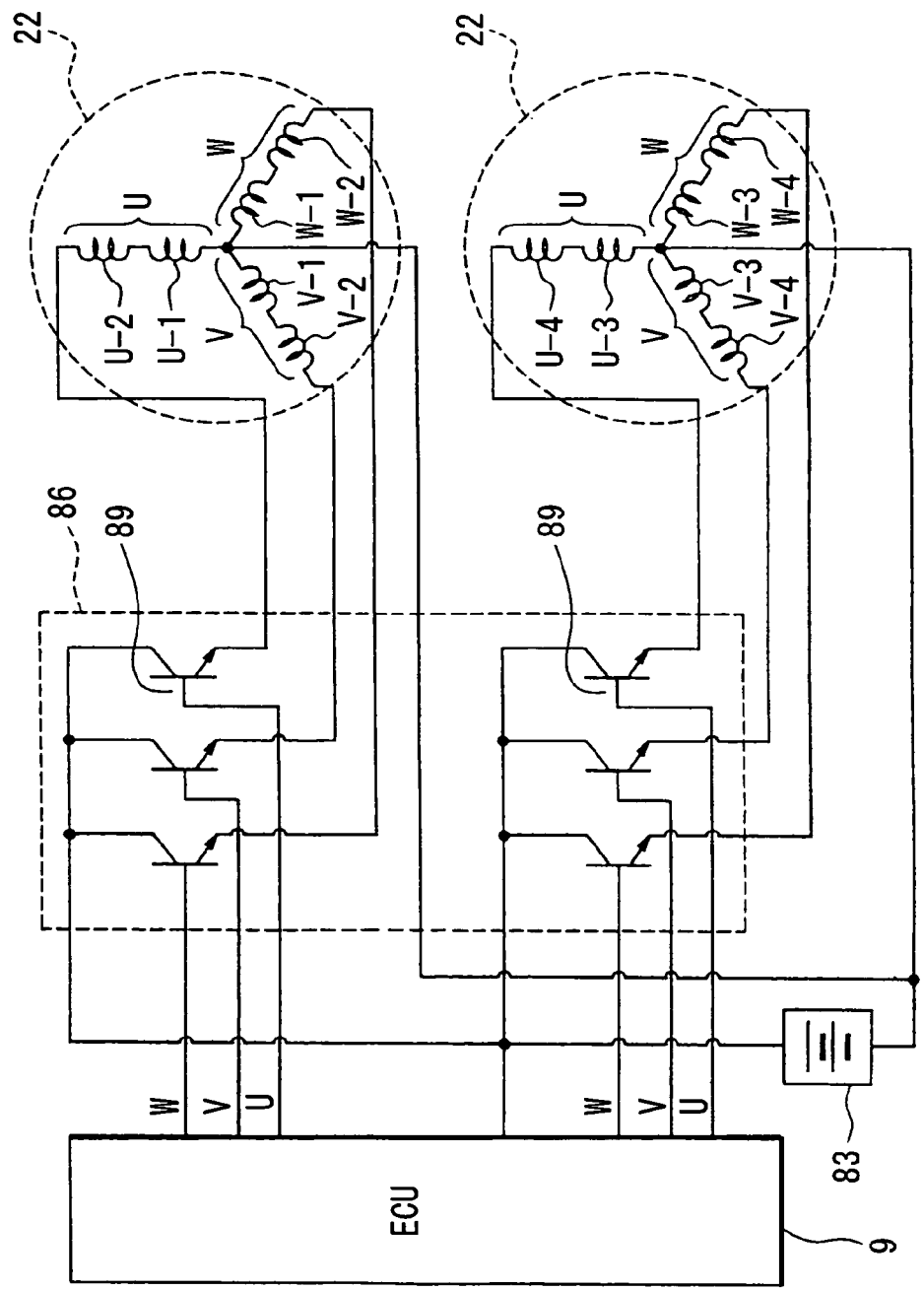
FIG. 6 is a schematic circuit diagram of a power supply circuit of the electric motor of the controller according to the first embodiment.
Figure 7:
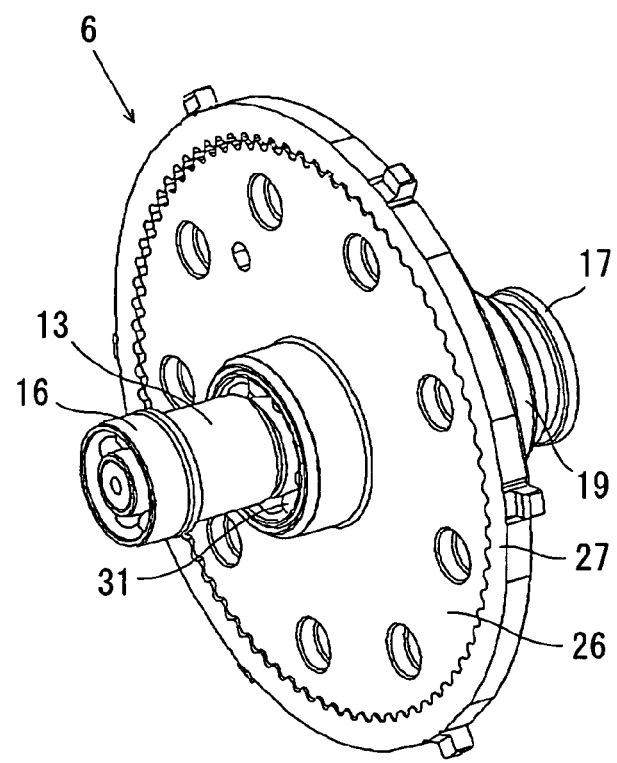
FIG. 7 is a perspective front view showing a reduction gear of the controller according to the first embodiment.
Figure 8:
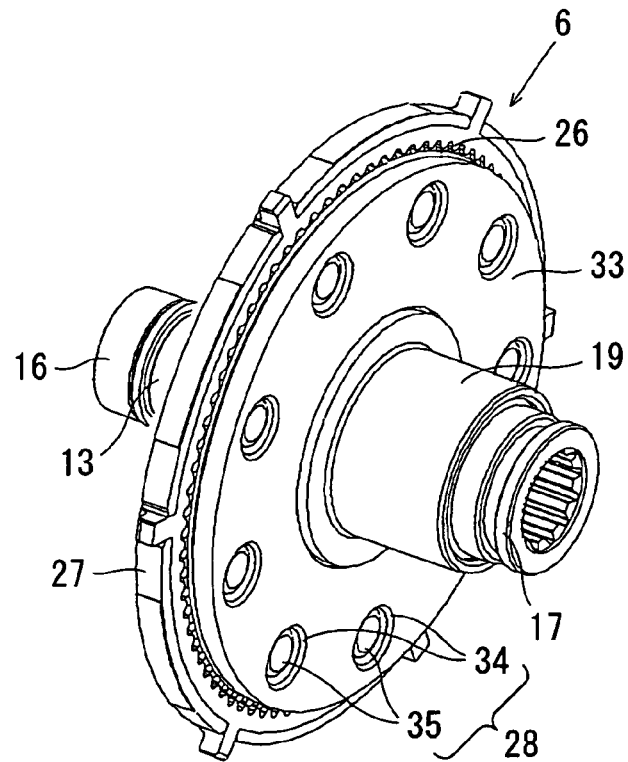
FIG. 8 is a perspective rear view showing the reduction gear of the controller according to the first embodiment.
Figure 9:
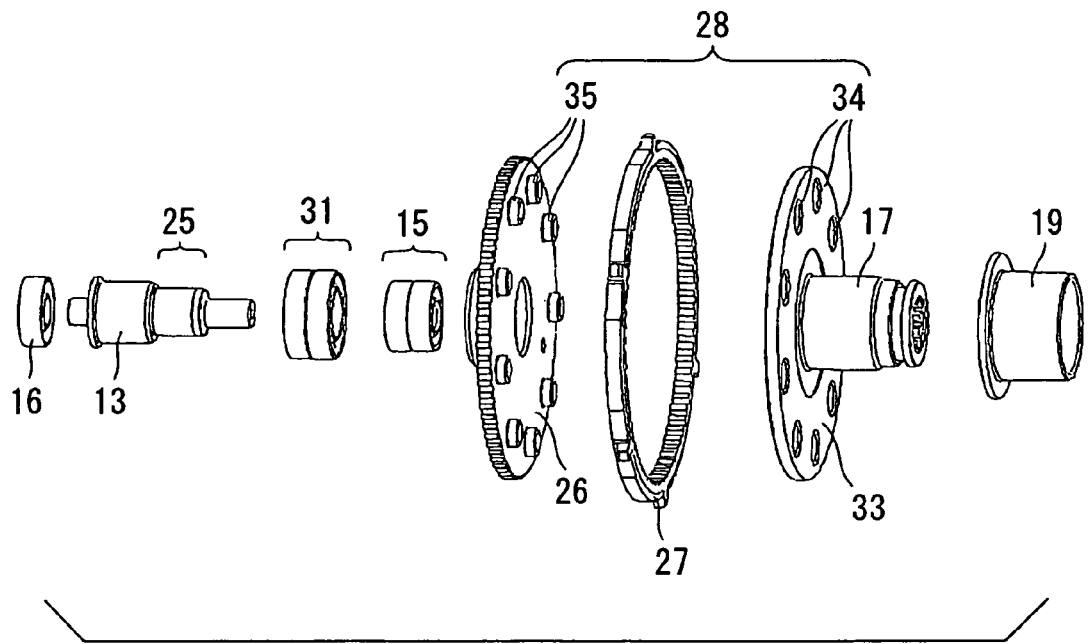
FIG. 9 is an exploded front perspective view of the reduction gears in the controller according to the first embodiment.

The exciting coils 22 are described in detail in the following, referring to FIGS. 5 and 6. As shown in FIG. 6, the exciting coils 22 is formed by a star connection of the coils U, V and W, which are electrically independently wound from each other. Specifically, the coils U, V and W are respectively placed on the stator teeth 23 that are sequentially aligned in the rotational direction of the electric motor 5. The exciting coils 22 are alternately magnetized to be north and south magnetic poles in the rotational direction when energized. For example, when inner ends of the coils U-1, W-1, V-2, U-3, W-3 and V-4 are magnetized to be north magnetic poles, inner ends of the coils V-1, U-2, W-2, V-3, U-4 and W-4, which are adjacent to the coils U-1, W-1, V-2, U-3, W-3 and V-4, are magnetized to be south magnetic poles. Accordingly, when the coils U-1, U-2, U-3 and U-4 are energized, for example, radially inner portions of radially-opposed two coils U-1 and U-3 are magnetized to be north magnetic poles, and radially inner portions of the other radially-opposed two coils U-2 and U-4, which are shifted by 90 degrees from the coils U-1 and U-3 in the rotational direction of the electric motor 5.

The rotor core 14 is formed by stacking a number of thin plates, and press-fitted to and fixed on the rotor shaft 13. The rotor core 14 is provided with rotor teeth 24, which are extroverted salient poles protruding radially outward to the stator core 21 at every 45 degrees in the rotational direction of the electric motor 5. The rotor 11 is rotated in a normal or reverse rotational directions by switching energizing positions and energizing directions of each of the coils U, V and W to switch the stator teeth 23 that magnetically attract the rotor teeth 24 sequentially.

The reduction gears 6 are described in detail in the following, referring to FIGS. 3 and 7 to 9. The reduction gears 6 are cycloidal gears, for example. The reduction gears 6 are some type of a planetary gear train, which constructs an inscribed planetary gear reduction mechanism. The reduction gears 6 include a sun gear 26, i.e., an inner gear or an external gear, a ring gear 27, i.e., an outer gear or an internal gear, and a transmission device 28. The sun gear 26 is supported by an eccentric portion 25 of the rotor shaft 13 to rotate eccentrically with respect to the rotor shaft 13. An inner circumference of the ring gear 27 engages with an outer circumference of the sun gear 26. The transmission device 28 transmits only a rotation component of the sun gear 26 on its axis to the output shaft 17.

The eccentric portion 25 is a shaft that rotates eccentrically about the rotation center of the rotor shaft 13, to oscillate and rotate the sun gear 26 along an orbital path. The eccentric portion 25 rotatably supports the sun gear 26 via a sun gear bearing 31, which is located on an outer circumference of the eccentric portion 25. As described above, the sun gear 26 is rotatably supported via the sun gear bearing 31 by the eccentric portion 25 of the rotor shaft 13 so that the rotation of the eccentric portion 25 rotate the sun gear 26 to push the sun gear 26 onto the inner circumference of the ring gear 27. The ring gear 27 is fixed to the front housing 18.

Figure 4:
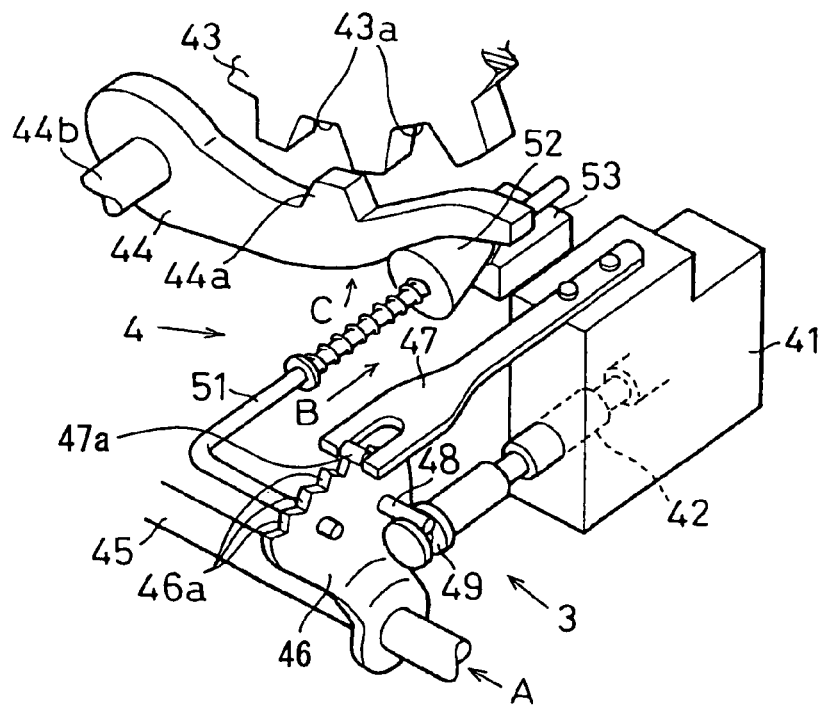
FIG. 4 is a perspective view showing the shift position switching unit of the controller according to the first embodiment.

A plurality of inner pin holes 34 are concentrically formed on a flange 33, which is formed at a rear end of the output shaft 17 to rotate integrally with the output shaft 17. The flange 33 is arranged to the rear end of the output shaft 17. A plurality of inner pins 35 are formed on the sun gear 26 to engage loosely with the inner pin holes 34 of the flange 33. The inner pin holes 34 and the inner pins 35 serves as the transmission device 28. The inner pins 35 protrude beyond a front face of the sun gear 26. Engagements between the inner pins 35 and the inner pin holes 34 transmit the rotation component of the sun gear 26 on its axis to the output shaft 17. In this structure, the rotation of the rotor shaft 13 eccentrically rotates the sun gear 26, so that the sun gear 26 rotates at a rotation speed reduced from that of the rotor shaft 13. The reduced rotation speed of the sun gear 26 is transmitted to the output shaft 17. The output shaft 17 is connected with a control rod 45 of the shift position switching mechanism 3, which is shown in FIG. 4 and described below.

The transmission device 38 may be modified so that the sun gear 26 has the inner pin holes 34 and the flange 33 has the inner pins 35, dissimilarly to the above structure.

The shift position switching mechanism 3 and the parking switching mechanism 4 are described in detail in the following, referring to FIG. 4. The above-described output shaft 17 of the reduction gears 6 moves the shift position switching mechanism 3, to switch the effective shift position of automatic transmission 2. A manual spool valve 42 of a hydraulic valve body 41 is slid and displaced to appropriate positions to switch hydraulic pressure supply passages, which is communicated to a hydraulic clutch (not shown) of the automatic transmission 2. The engagement condition of the hydraulic clutch is controlled in this manner to switch the shift positions such as P, R, N, and D in the automatic transmission 2.

The parking switching mechanism 4 is interlocked with the shift position switching mechanism 3. The output shaft of the automatic transmission 2 is mechanically locked when the effective shift position is in the parking range (P). The parking switching mechanism 4 locks and unlocks the output shaft of the automatic transmission 2 in accordance with an engagement and a disengagement between a depression 43*a* of a park gear 43 and a projection 44*a* of the park pole 44. The park gear 43 is coupled via a driveshaft (not shown) and a differential gear (not shown) to the output shaft of the automatic transmission 2. A rotational restriction of the park gear 43 locks an output shaft of the transmission at the side of the drive wheel of the vehicle, to set the vehicle in the parking state.

A detent plate 46 is fixed on the control rod 45, which is driven by the reduction gears 6, by using a spring pin (not shown) and the like. The detent plate 46 is formed in a substantially sector shape, and has a plurality of recessions 46*a* at a radially peripheral portion thereof, that is, along an arc portion of the sector shape. A detent spring 47 is fixed to the hydraulic valve body 41. The detent spring 47 has a hooking portion 47*a* at a leading end of the detent spring 47 hooks to one of the recessions 46*a* of the detent plate 46, to keep the switched shift position.

A pin 48 is fixed on the detent plate 46 to operate the manual spool valve 42. The pin 48 engages with a groove 49 that is formed in an end portion of the manual spool valve 42. When the detent plate 46 is rotated by the control rod 45, the pin 48 moves along an arc-shaped path, so that the manual spool valve 42, which engages with the pin 48, linearly moves in the hydraulic valve body 41.

When the control rod 45 is rotated clockwise when seen in a direction shown by the arrow A in FIG. 4, the pin 48 pushes the manual spool valve 42 into the hydraulic valve body 41 via the detent plate 46, to switch the hydraulic passages in the hydraulic valve body 41 in the order of "D", "N", "R", and "P" positions. That is, the shift position of the automatic transmission 2 is switched in the order of "D", "N", "R", and "P" positions. When the control rod 45 is rotated in the reverse direction, the pin 48 pulls the manual spool valve 42 out of the hydraulic valve body 41, to switch the hydraulic passages in the hydraulic valve body 41 in the order of "P", "R", "N", and "D" positions. That is, the shift position of the automatic transmission 2 is switched in the order of "P", "R", "N", and "D" positions.

A park rod 51 is coupled to the detent plate 46 to operate the park pole 44. The park rod 51 has a conical portion 52 at a leading end thereof. The conical portion 52 is interposed between a protrusion 53 of the housing of the automatic transmission 2 and the park pole 44. When the control rod 45 is rotated clockwise when seen in a direction of the arrow A in FIG. 4, that is, from the R range to the P range, the park rod 51 is displaced by the detent plate 46 to a side indicated by the arrow B in FIG. 4. Thus, the conical portion 52 raises the park pole 44, so that the park pole 44 rotates about a shaft 44*b* in a rotational direction shown by the arrow C in FIG. 4. Then, the projection 44*a* of the park pole 44 engages with the depression 43*a* of the park gear 43, to set the parking switching mechanism 4 in a locked condition.

When the control rod 45 is rotated counterclockwise, that is, from the P range to the R range, the park rod 51 is pulled back to a side opposite from the arrow B in FIG. 4, so that the conical portion 52 stops raising the park pole 44. The park pole 44 is regularly urged by a spring (not shown) in a rotational direction opposite from the arrow C in FIG. 4, so that the projection 44*a* of the park pole 44 is disengaged from the depression 43*a* of the park gear 43. In this condition, the park gear 43 is free from the park pole 44, to set the parking switching mechanism 4 in an unlocked state.

An encoder 7 of the actuator 1 is described in detail in the following, referring to FIGS. 3 and 10A to 14B. The housing of the actuator 1, which is formed from a front housing 18 and a rear housing 20, accommodates the encoder 7 that detects the rotation angle of the rotor 11. The encoder 7 corresponds to the rotation angle detecting device according to the present invention. A switching operation of a current supply to the exciting coils 22 in accordance with the rotation angle of the rotor 11 detected by using the encoder 7 can rotate the electric motor 5 at high speed without causing a loss of synchronization.

Figure 13:
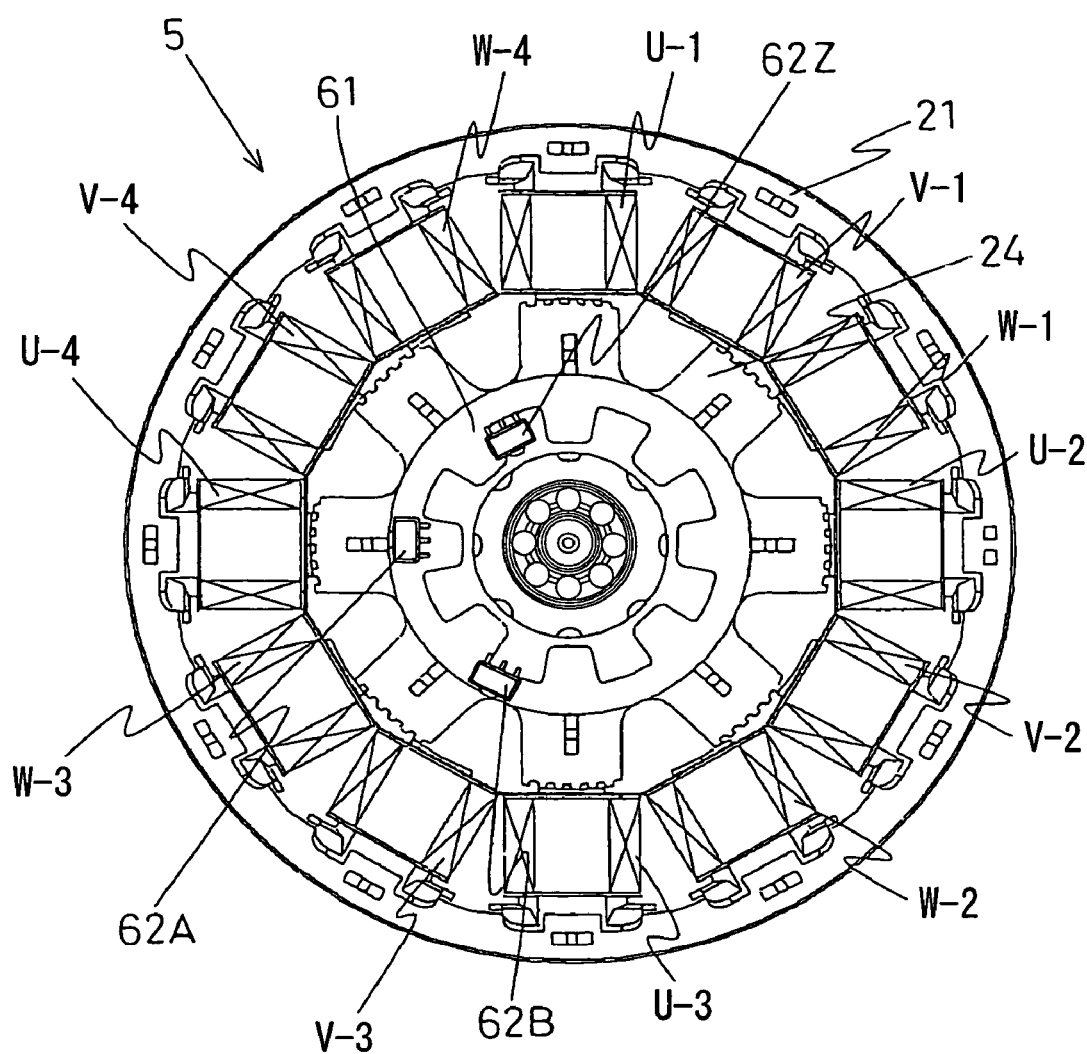
FIG. 13 is a front view showing an arrangement of Hall ICs in the electric motor of the controller according to the first embodiment.

The encoder 7 is an incremental encoder, which includes a magnet 61 and a Hall IC 62. The magnet 61 rotates integrally with the rotor 11. The Hall IC 62 is installed in the rear housing 20 to detect magnetism. As shown in FIG. 13, the Hall IC 62 includes a first angular Hall IC 62A, a second angular Hall IC 62B, and an index Hall IC 62Z. The Hall IC 62 is supported by a substrate 63, which is installed in the rear housing 20 as shown in FIG. 3.

Figure 12:
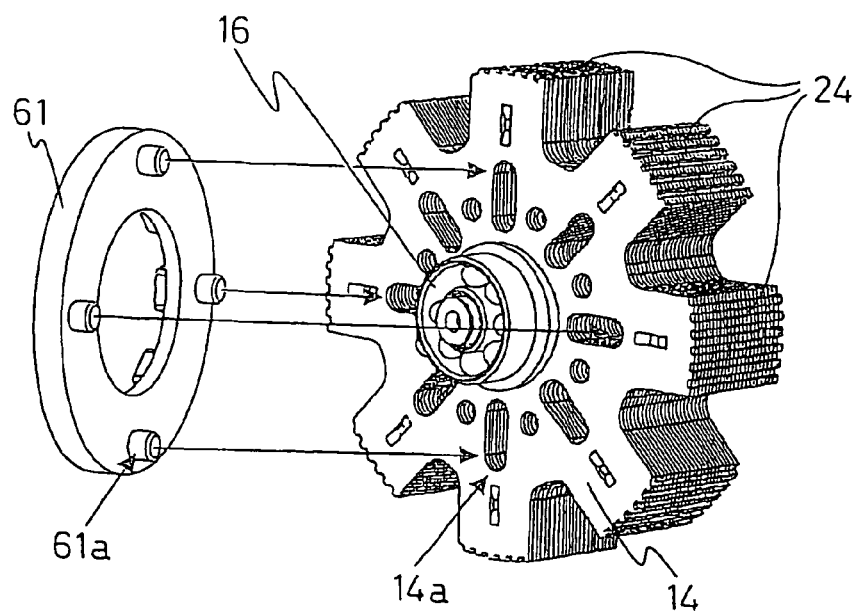
FIG. 12 is an exploded perspective view showing the rotor and the magnet of the controller according to the first embodiment.
Figure 10A:
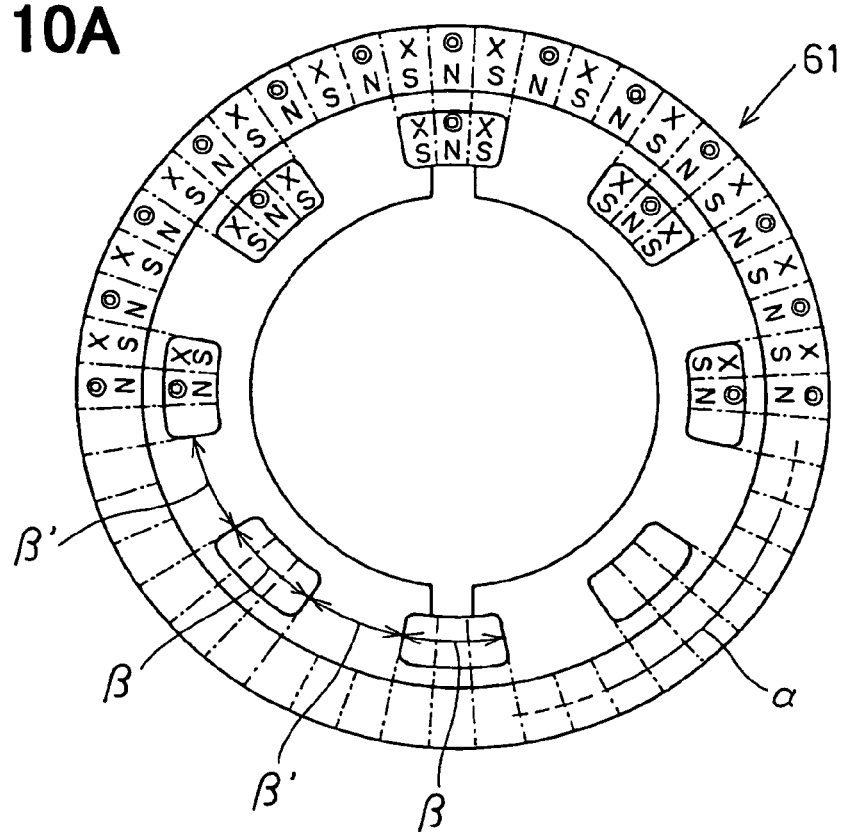
FIG. 10A is a front view showing a magnet and its magnetization state in the controller according to the first embodiment.
Figure 10B:
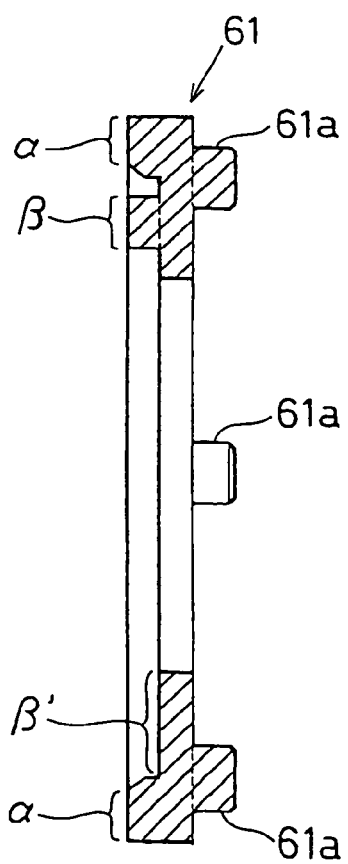
FIG. 10B is a cross-sectional view showing the magnet in the controller according to the first embodiment.
Figure 11:
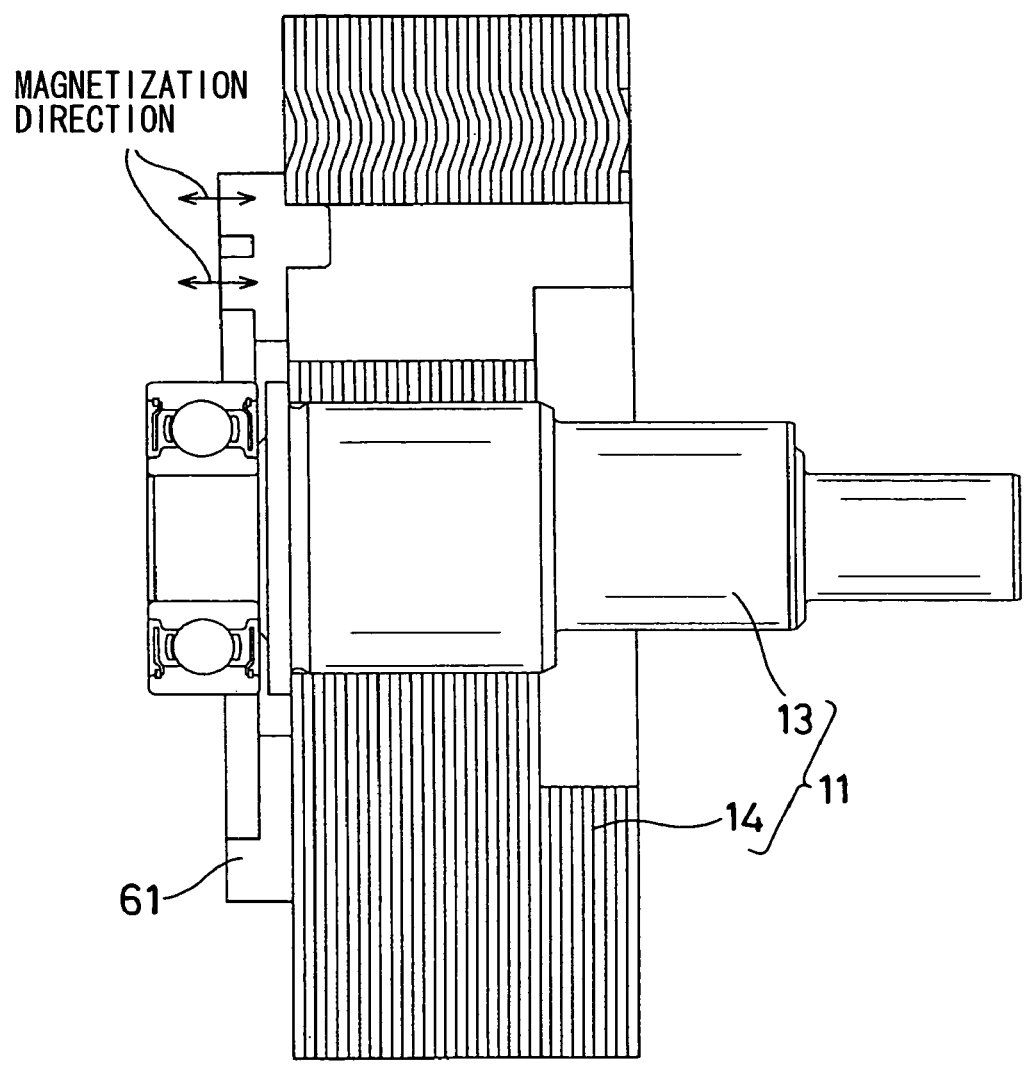
FIG. 11 is a cross-sectional view showing a rotor with the magnet in the controller according to the first embodiment.

As shown in FIGS. 10A to 12, the magnet 61 is formed in a substantially annular disc shape, arranged coaxially to the rotor shaft 13 and fixed to an axial end face at the rear side of the rotor core 14. As shown in FIG. 12, the rear face of the rotor core 14 has a plurality of alignment holes 14a for aligning the magnet 61. The magnet 61 has a plurality of protrusions 61a on its mating faces with the rotor core 14 to correspond to the alignment holes 14a. The protrusions 61a of the magnet 61 are inserted into the corresponding alignment holes 14a of the rotor core 14, to attach the magnet 61 onto the rotor core 14 to align the magnet 61 with a rotation center of the rotor core 14. As shown in FIG. 11, the magnet 61 has the rear face, which faces the Hall IC 62. The rear face of the magnet 61 is magnetized to generate magnetism in the axial direction of the magnet 61, so as to detect the rotation angle and indexes.

Magnetization of the rear face of the magnet 61, which faces with the Hall IC 62, is described in the following referring to FIGS. 10A and 10B. The magnet 61 has a angular magnetized portion a along an outer circumference on the rear surface thereof. The angular magnetized portion α has multipolar magnetized portions along the rotational direction thereof to generate and terminate rotational angular signals. Magnetized index portions β and non-magnetized index portions β' are provided to be adjacent to the inner circumference of the angular magnetized portion α along the rotational direction of the magnet 61. The magnetized index portions β generate and terminate the index signals. The non-magnetized index portions β' do not perform the operation to generate the index signals.

The angular magnetized portion α has multipolar magnetized portions along the rotational direction thereof to generate rotational angular signals, which includes A-phase signals and B-phase signals. In the structure of the angular magnetized portion α shown in FIG. 10A, north pole portions, which generate north pole magnetism, and south pole portions, which generate the magnetism, are alternatively arranged at intervals of 7.5 degrees in the rotational direction of the electric motor 5. That is, the angular magnetized portion α has 48 poles of A-phase sensing portions and B-phase sensing portions.

The magnetized index portions β respectively generate index signals, which are referred to as Z-phase signals in the following, at intervals of 45 degrees. The exciting coils 22 of U-phase, V-phase, and W-phase are respectively energized at the intervals of 45 degrees. Each of the magnetized index portions β includes a north pole portion extending over 7.5 degrees to generate the Z-phase signal north pole magnetism, and two south pole portions on both sides of the north pole portion. The non-magnetized index portions β' are provided between two magnetized index portions β in the rotational direction of the electric motor 5, which are not magnetized and do not generate the Z-phase signals.

Figure 14A:
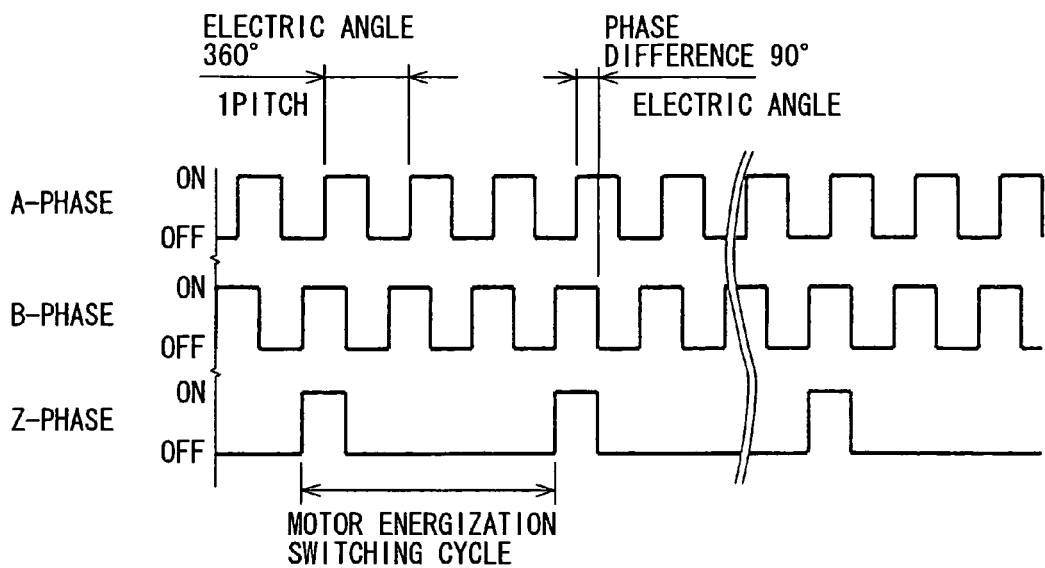
FIG. 14A is a waveform chart showing output signals of A-phase, B-phase, and Z-phase of the electric motor of the controller according to the first embodiment, when the rotor rotates in a reverse direction.
Figure 14B:
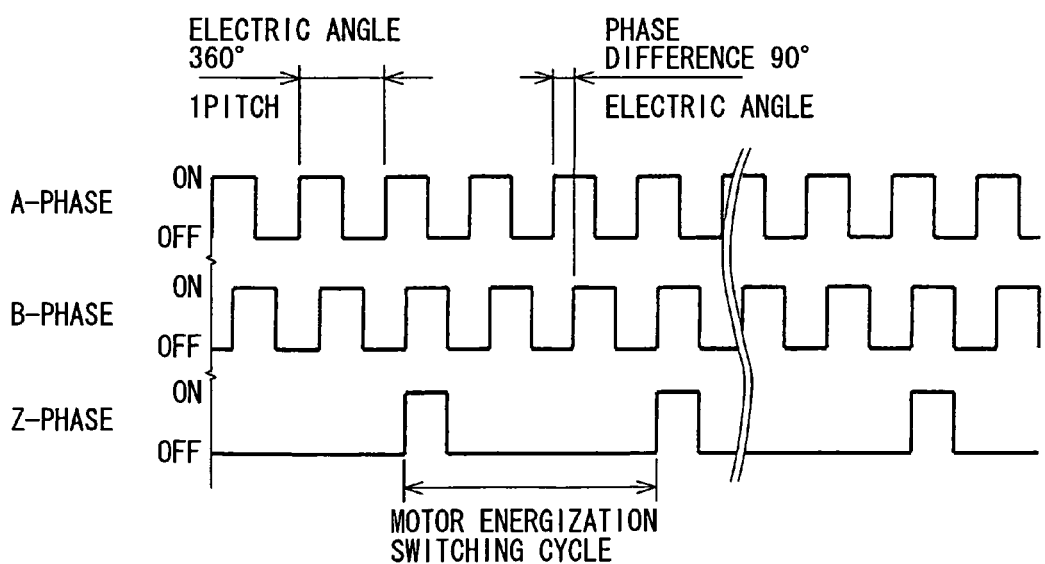
FIG. 14B is a waveform chart showing output signals of A-phase, B-phase, and Z-phase of the electric motor of the controller according to the first embodiment, when the rotor rotates in a forward direction.
Figure 15:
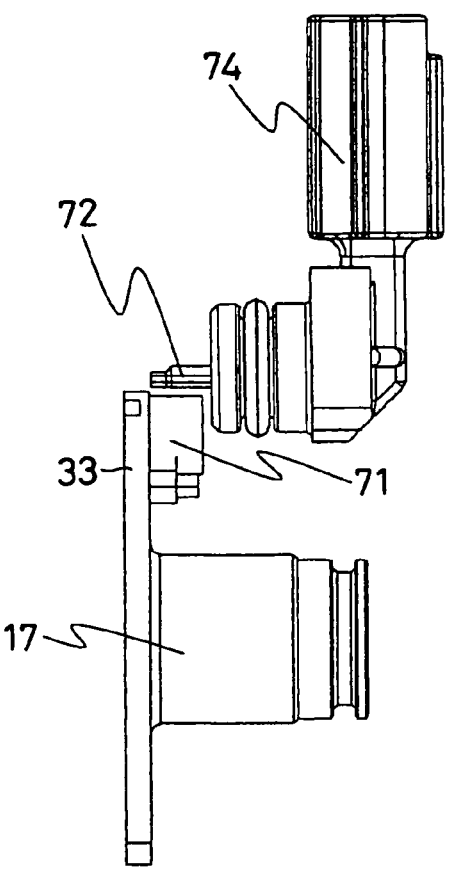
FIG. 15 is a side view showing an angle sensor of the controller according to the first embodiment.
Figure 16:
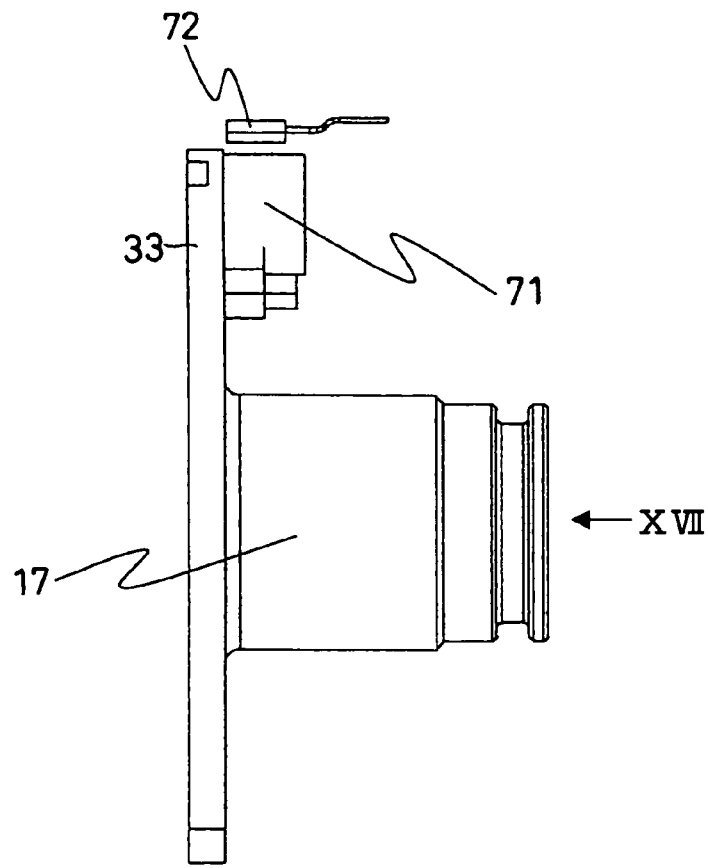
FIG. 16 is a side view showing a linear output Hall IC of the controller according to the first embodiment.

The substrate 63 supports the first and second angular Hall ICs 62A, 62B to face the angular magnetized portion a in the axial direction of the electric motor 5. The substrate 63 supports the index Hall IC 62Z to face the magnetized index portions β and non-magnetized index portions β' in the axial direction of the electric motor 5. As shown in FIGS. 14A and 14B, the first and second angular Hall ICs 62A, 62B are arranged so that the A-phase signal and the B-phase signal generate a phase lag of 3.75 degrees therebetween, i.e., 90 degrees in electric angle.

A Hall element and an ON-OFF signal generating IC are integrated in each of the first and second angular Hall ICs 62A, 62B and the index Hall IC 62Z. The Hall element generates a signal in accordance with an amount of magnetic flux passing therethrough. When north pole side magnetic flux applied to the Hall element becomes greater than a threshold, the ON-OFF signal generating IC turns on the angular signals, that is, the A-phase signals, B-phase signals and Z-phase signals. When south pole side magnetic flux applied to the Hall element becomes greater than a threshold, the ON-OFF signal generating IC turns off the angular signals, that is, the A-phase signals, B-phase signals and Z-phase signals.

In the first embodiment, the Hall element and the ON-OFF signal generating circuit are integrated in each of the Hall ICs, that is, the first and second angular Hall ICs 62A, 62B, and the index Hall IC 62z, as an example. However, the Hall element may be provided individually from the ON-OFF signal generating circuit. Specifically, the ON-OFF signal generating circuit may be assembled on the substrate 63 separately from the Hall element. The ON-OFF signal generating circuit may be assembled into the motor controller 9.

Output waveforms of the A-phase signals, B-phase signals and Z-phase signals from the encoder 7 is described in the following, referring to FIGS. 14A and 14B. A phase difference between the A-phase signal and the B-phase signal is 3.75 degrees, which corresponds to 90 degrees in electric angle, for example. In the first embodiment, every 15 degrees of the rotation of the rotor 11 generates one period of the A-phase signal and one period of the B-shape signal. Every 45 degrees of the rotation of the rotor 11 generates one Z-phase signal, to switch energization state of the electric motor 5. The Z-phase signal is an ON signal in the first embodiment. The Z-phase signal determines an energization phase of the electric motor 5 and a relative position of the A-phase and the B-phase.

The substrate 63 supports the first and second angular Hall ICs 62A, 62B to face the angular magnetized portion α in the axial direction of the electric motor 5. The substrate 63 supports the index Hall IC 62Z to face the magnetized index portions β and non-magnetized index portions β' in the axial direction of the electric motor 5. The substrate 63 is fixed on the rear side faces of the exciting coils 22 and installed in housing 20.

The output angle detector 8 is described in the following, referring to FIGS. 3 and 15 to 18.

The actuator 1 is provided with the output angle detector 8 that detects a rotation angle of the output shaft 17. The motor controller 9 detects the effective shift position such as "P", "R", "N", "D", etc., which is practically set by the shift position switching mechanism 3, by using the rotational angle of the output shaft 17 detected by the output angle detector 8.

The output angle detector 8 detects the output angle of the output shaft 17 as a continuous quantity. The output angle detector 8 includes a magnet 71 that is fixed on a front face of the flange 33 integrally rotating with the output shaft 17, and a linear output Hall IC 72.

Figure 17:
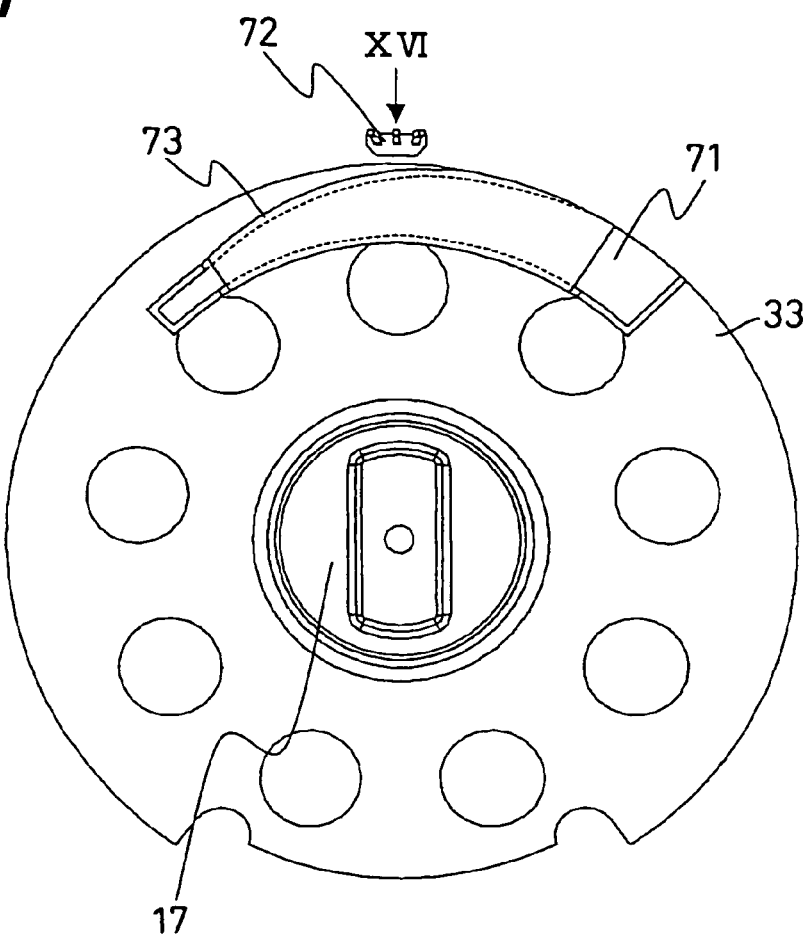
FIG. 17 is a side view showing the linear output Hall IC of the controller according to the first embodiment, seen in a direction of arrow XII of FIG. 16.

As shown in FIG. 17, the magnet 71 has an approximately crescent-like shape when seen in the axial direction of the electric motor 5, and molded by a resin 73. The magnet 71 is magnetized so that the magnetic flux intersects the linear output Hall IC 72 in the direction of arrow VII in FIG. 17. The magnetic flux density passing through the linear output Hall IC 72 changes in accordance with a variation of a distance between the magnet 71 and the linear output Hall IC 72 within a rotation range of the output shaft 17, that is, within the traveling range of the effective shift position.

Specifically, in the first embodiment, the distance between the magnet 71 and the linear output Hall IC 72 is at maximum, that is, the magnetic flux density passing through the liner output Hall IC 72 is at minimum, when the output shaft 17 is at a rotational angle to set the effective shift position to "D". The distance between the magnet 71 and the linear output Hall IC 72 is at minimum, that is, the magnetic flux density passing through the linear output Hall IC 72 is at maximum, when the output shaft 17 is at a rotational angle to set the effective shift position to "P".

Figure 18:
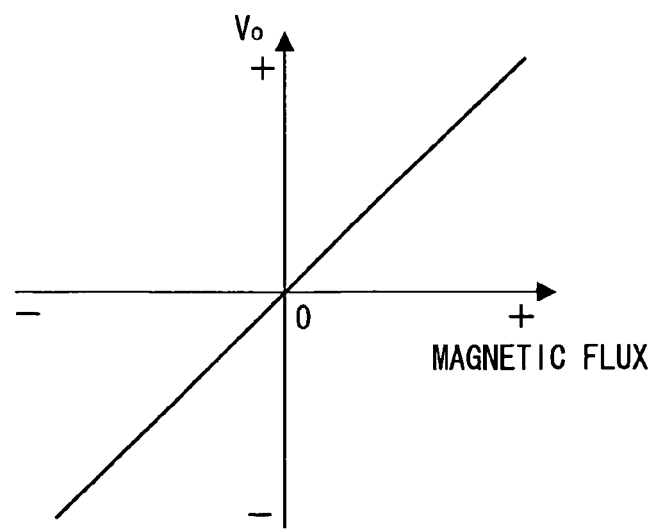
FIG. 18 is a graph showing a relation between a magnetic flux and an output voltage of the linear output Hall IC of the controller according to the first embodiment.

The linear output Hall IC 72 is incorporated in a connector 74 that is formed from resin. The linear output Hall IC 72 is provided with a Hall element that generates an output voltage in accordance with the magnetic flux density passing through the linear output Hall IC 72. As shown in FIG. 18, the linear output Hall IC generates a larger output voltage as the magnetic flux density passing through the linear output Hall IC 72 increases. Thus, the rotational angle of the output shaft 17 and the effective shift position are detected by using the output voltage of the linear output Hall IC 72.

The motor controller 9 is described in detail in the following, referring to FIG. 1. The motor controller 9, which performs the energizing control of the electric motor 5, is served by a conventional microcomputer including a CPU for performing control and calculation processes, a first memory device 81 that stores respective programs and data therein, an input circuit, an output circuit, a power supply circuit, etc.

In FIG. 1, the referential numeral 82 denotes an activation switch such as an ignition switch or an accessory switch of the vehicle, the referential numeral 83 denotes a vehicle-mounted battery, the referential numeral 84 denotes a hydraulic pressure controller of the automatic transmission 2 that controls an engaging state of a hydraulic clutch, the referential numeral 85 denotes an indicator and/or an alarm such as indication displays, warning lamps, warning voices, etc. which notifies a state of the automatic transmission 2 such as the effective shift position and the like, the referential numeral 86 denotes a coil driving current of the electric motor 5, the referential numeral 87 denotes a vehicle speed sensor, the referential numeral 88 denotes an other sensor that detects the other states of the vehicle including a setting switch or a detection sensor of a shift position selector operated by a driver.

The motor controller 9 starts being energized by the battery 83 when the activation switch 82 is turned on, performs respective calculation processes and stops being energized by the battery 83 after performing a power shutting down process when the activation switch 82 is turned off. That is, the current supply to the motor controller 9 is started by turning on the activation switch 82, and stopped by turning off the activation switch 82.

The coil driving circuit 86 is described in detail in the following, referring to FIG. 6. As described above, the electric motor 5 has a star connection of the coils U, V and W. The coil driving circuit 86 has a switching element 89 that performs an energization control for each of the U-phase coils, V-phase coils and W-phase coils. The motor controller 9 turns on and off the switching element 89 to change the energizing state of the coils U, V and W.

Figure 19A:
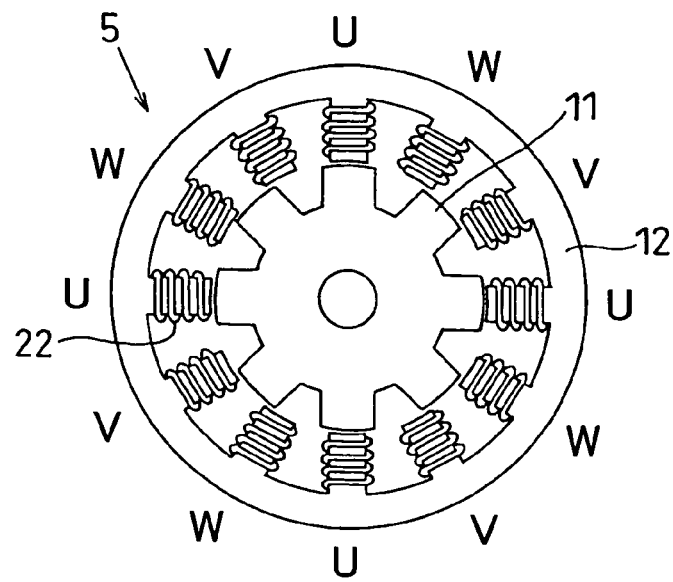
FIG. 19A is a schematic diagram showing an electric motor of the controller according to the first embodiment.
Figure 19B:
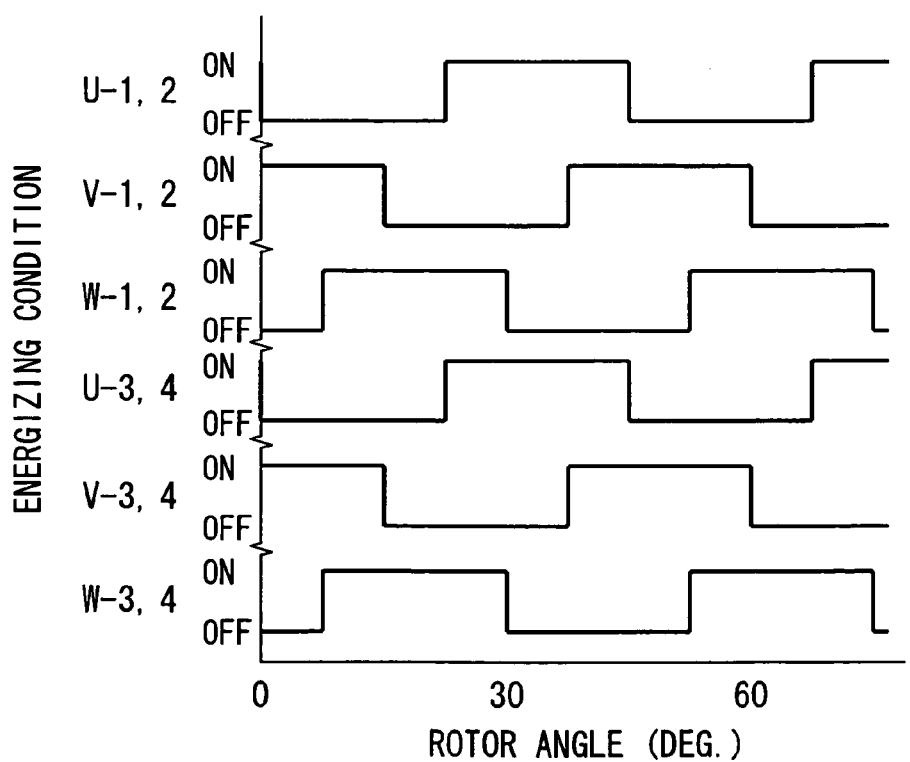
FIG. 19B is a graph showing energizing conditions of exciting coils of the electric motor of the controller according to the first embodiment.

As shown in FIG. 19, the motor controller 9 turns on and off the switching element 89 based on correction terms such as the rotation angle, an excitation lag, etc. of the rotor 11, which are detected by the encoder 7, and/or by an open control in some cases, to rotate the rotor 11.

The motor controller 9 includes respective control programs such as a rotor angle determination program, an output angle determination program, a motor control program, etc. The rotor angle determination program is for determining the rotational direction, the rotational speed, the number of revolutions and the rotational angle of the rotor 11 by using the output of the encoder 7, which includes outputs of the first and second angular Hall ICs 62A, 62B and the index Hall IC 62Z. The output angle determination program is for determining the output angle of the output shaft 17, that is, the effective shift position, by using the output of the output angle detector 8, which includes the output of the linear output Hall IC 72. The motor control program is for controlling the electric motor 5 to set the effective shift position, which is detected by using the output angle determination program, to the shift position selected by the shift position selector.

The motor control means is served by a motor control program. When the effective shift position, which is detected by the output angle detector 8, i.e., the effective shift position detected by the motor controller 9, differs from a target shift position, which is set by a shift position switching command of the shift position setting means, the motor control program controls the electric motor 5 to adjust the effective shift position to the target shift position. Specifically, the motor control program controls current supplies to the exciting coils 22 of U-phase, V-phase and W-phase to determine the rotational direction, the rotational speed, the number of revolutions and the rotational angle of the electric motor 5. The current supplies to the exciting coils 22 are controlled based on a difference between the target shift position and the effective shift position.

In the first embodiment, a vehicle door is mounted on the vehicle. The vehicle door is a vehicular door, a trunk lid, a power tailgate, a fuel filler lid, etc, for example. A vehicle door controller 91, which is shown in FIG. 1, controls a lock and an unlock operations of the vehicle door. The vehicle door controller 91 operates by being energized by the battery 83 even when the engine is not driving, to prohibit at least an opening operation of the vehicle door.

It is desirable that the opening operations of the vehicle doors are performed only when the vehicle is securely parked, even if the engine of the vehicle is stopped. As described above, the motor controller 9 must be continuously energized even while the vehicle is parked and the engine is stopped, to detect the effective shift position at all times so that the vehicle door controller 91 allows the operation of the vehicle-mounted equipment only when the effective shift position is set to "P" position, in the vehicle in which the actuator 1 switches the effective shift position of the automatic transmission 2. However, a capacity of the battery 83, which is mounted on the vehicle, is limited. Accordingly, the battery 83 runs out if it continues to energize the motor controller 9 to detect the effective shift position when the engine is stopped.

The controller according to the first embodiment is provided with the following configurations to solve the above-mentioned issues.

(1) A self current supply stop process, which is provided in the motor controller 9 to stop the current supply to the motor controller 9 automatically when the vehicle is parked and the engine is stopped.

(2) A second memory device 92, which is a memory device such as a RAM, an EEPROM, a SRAM, etc. provided in the vehicle door controller 91 to store data therein.

(3) An effective shift position memorization process, which memorizes the effective shift position, which is detected at a timing when the current supply to the motor controller 9 is stopped, in the second memory device 92.

(4) A vehicle door lock/unlock process, which is provided in the vehicle door controller 91 to prohibit an operation of the vehicle-mounted equipment such as an opening operation of a vehicle door when the effective shift position memorized in the second memory device 92 differs is not "P" position, even when the current supply to the motor controller 9 is stopped.

Figure 2A:
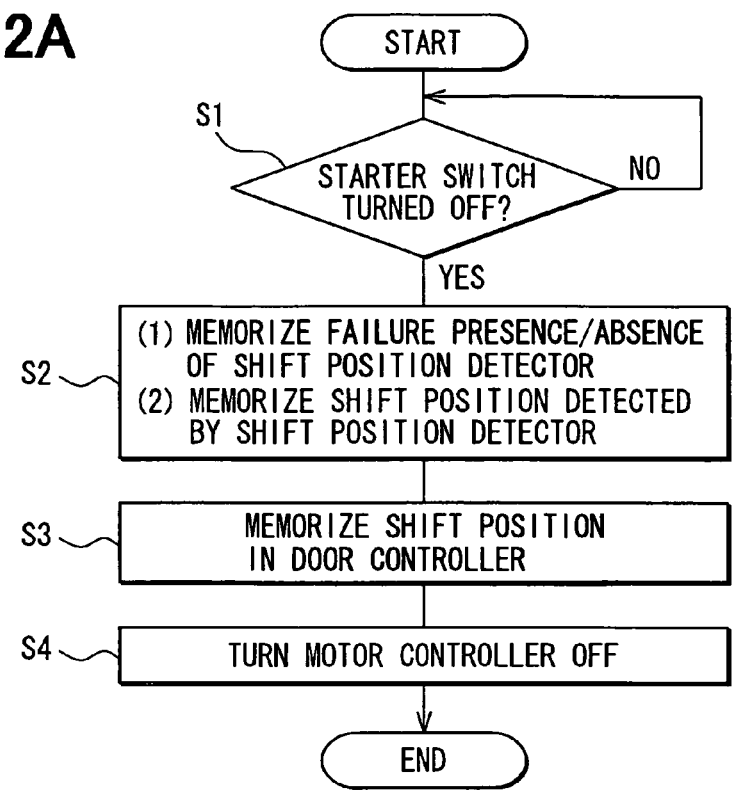
FIG. 2A is a flowchart showing an effective shift position memorizing process by the controller according to the first embodiment.

An example of the effective shift position memorization process is described in detail in the following, referring to a flowchart shown in FIG. 2A. Firstly, the vehicle door controller 91 determines whether the activation switch 82 is turned off or not in step S1. If No in the step S1, that is, if the activation switch 82 is turned on, the process goes back to the step S1. If Yes in the step S1, that is, if the activation switch 82 is turned off, the motor controller 9 memorizes (1) a failure presence or a failure absence of the output angle detector 8 and (2) the effective shift position detected by the output angle detector 8 in the first memory device 81 in step S2. Specifically, the motor controller 9 memorizes the rotational angle detected by the output angle detector 8, which corresponds to the effective shift position. Then, the motor controller 9 transmits the effective shift position, which is detected by the output angle detector 8, to the vehicle door controller 91, and memorizes the effective shift position, which is detected at a timing when the activation switch 82 is turned off, in the second memory device 92 in the vehicle door controller 91 in step S3. Further, the motor controller 9 stops being energized in step S4, and the effective shift position memorization process ends.

A detection of the above-mentioned failure of the output angle detector 8 is described in the following. The motor controller 9 has a function of a failure detector to detect the failure presence and the failure absence of the output angle detector 8. The failure detector detects the failure presence of the output angle detector 8 when an output voltage of the linear output Hall IC 72 of the output angle detector 8 is not in a predetermined range, when the output voltage of the linear output Hall IC 72 does not change in accordance with a current supply control to the electric motor 5 in controlling the electric motor 5, when the output voltage of the linear output Hall IC 72 is changed out of the predetermined range even when the electric motor 5 is not driven, etc. The failure detector puts a flag up when it detects the failure presence of the output angle detector 8, and then memorizes the failure presence of the output angle detector 8 in the first memory device 81 of the motor controller 9.

Figure 2B:
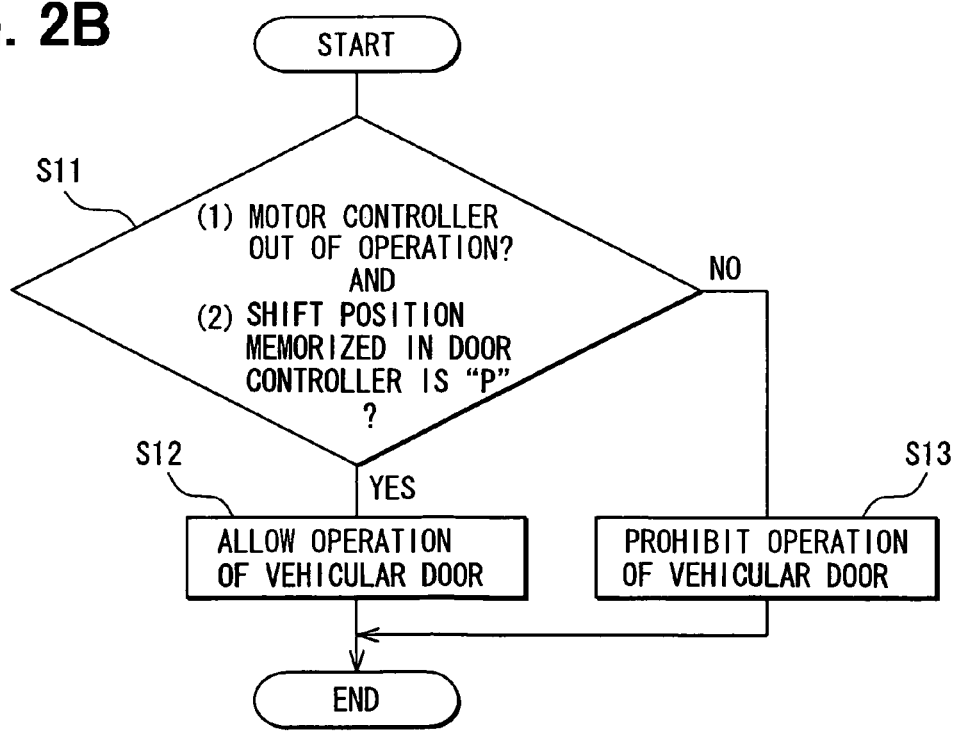
FIG. 2B is a flowchart showing a lock/unlock process by the controller according to the first embodiment.

An example of the vehicle door lock/unlock process is described in the following, referring to a flowchart shown in FIG. 2B. Firstly, the vehicle door controller 91 determines (i) whether the motor controller (i) is not energized and (ii) whether the effective shift position memorized in the vehicle door controller 91 is "P" position or not in step S11. If Yes in the step S11, it is determined that the engine of the vehicle stops and the vehicle is securely parked, so that the vehicle door controller 91 allows an operation of the vehicle-mounted equipment, which includes an opening operation of the vehicle door, in step S12, and then the vehicle-mounted equipment lock/unlock process ends. If No in the step S11, it is determined that the vehicle is not securely parked, so that the vehicle door controller 91 prohibits the operation of the vehicle-mounted equipment, which includes the opening operation of the vehicle door, in step S13, and then the vehicle-mounted equipment lock/unlock process ends.

The above-described configuration of the controller according to the first embodiment serves the following effects.

It is possible to detect the effective shift position without energizing the motor controller 9 when the engine stops, so that it is possible to decrease an electricity consumption of the battery 83 while the vehicle stops.

The motor controller 9 is not energized and the actuator 1 for switching the effective shift position does not operate while the vehicle is parked and the engine stops. Thus, the effective shift position that is memorized in the second memory device 92 while the vehicle is parked agrees with the effective shift position while the vehicle is parked.

If the effective shift position, which is memorized in the second memory device 92 while the vehicle is parked and the engine is stopped, differs from parking position, the vehicle door controller 91 prohibits the opening operation of the vehicle door, to secure a safety performance of the vehicle. That is, the controller for the vehicle-mounted component according to the first embodiment can secure the safety performance of the vehicle with small electricity consumption while the vehicle is parked.

Second Embodiment

Figure 20:
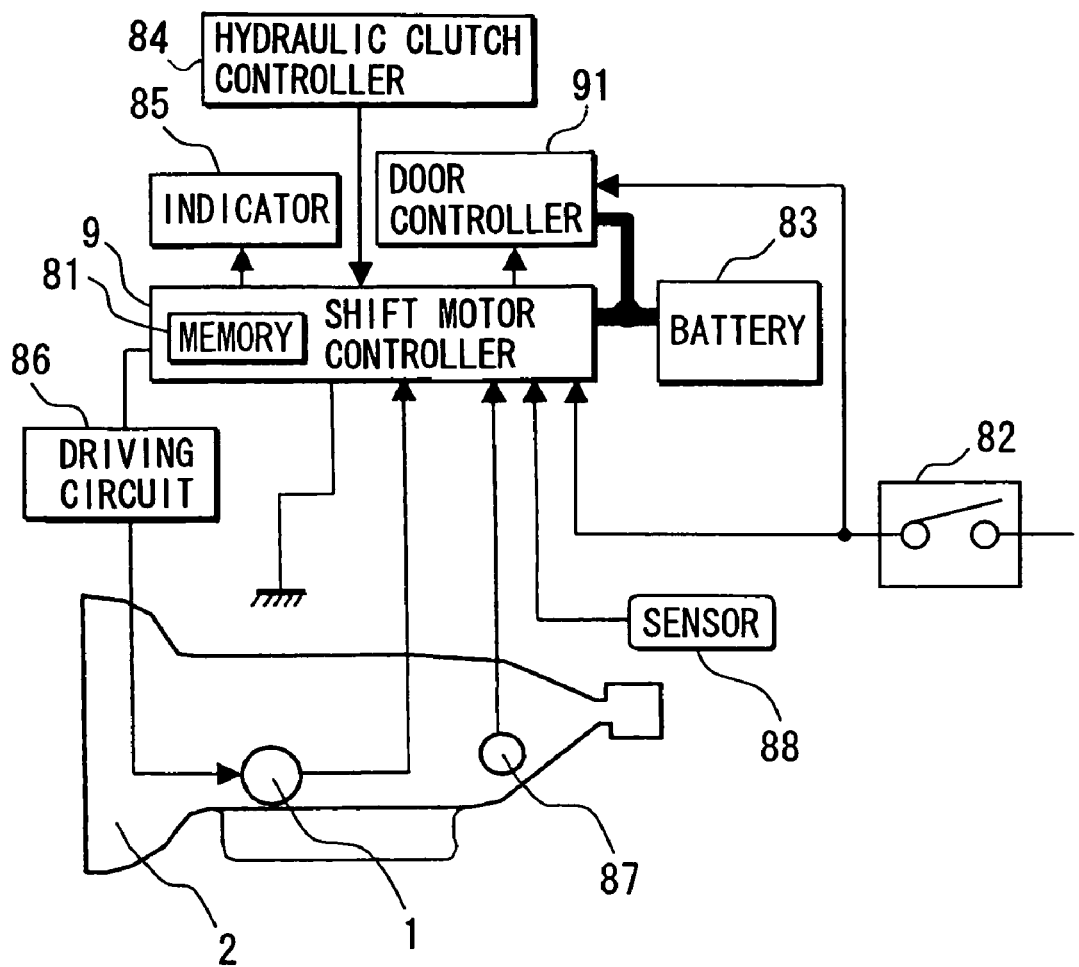
FIG. 20 is a block diagram showing a construction of a controller according to a second embodiment of the present invention.

A controller for a vehicle-mounted component according to a second embodiment of the present invention is described in the following, referring to FIG. 20. In the following, the elements, which are assigned referential numerals as same as those in the first embodiment, have substantially the same functions as those in the first embodiment.

In the above-described first embodiment, the motor controller 9 memorizes the effective shift position at the timing when the current supply to the motor controller 9 is stopped, in the second memory device 92 of the vehicle door controller 91. In the second embodiment, the motor controller 9 memorizes the effective shift position at the timing when the current supply to the motor controller 9 is stopped, in the first memory device 81 of the motor controller 9. As described above, the current supply to the motor controller 9 is stopped while the vehicle is parked, to decrease the electricity consumption. Thus, the first memory device 81 in the second embodiment is served by an EEPROM and/or a SRAM to memorize the effective shift position while the vehicle is parked.

EEPROMs are memory devices that can keep data stored therein even while a current supply thereto is completely stopped. SRAMs are memory devices that can keep data stored therein by supplying minute electricity thereto. When an EEPROM is used for the first memory device 81 to memorize the effective shift position, it is possible to stop the current supply to the motor controller 9 completely while the vehicle is parked. When a SRAM is used for the first memory device to memorize the effective shift position, a minute electricity is supplied to the motor controller 9 while the vehicle is parked to keep the effective shift position memorized in the first memory device 81.

By memorizing the effective shift position in the EEPROM and/or the SRAM of the motor controller 9 while the vehicle is parked as in the second embodiment, it is possible to stop the current supply to the first memory device 81 or to decrease the electricity consumption of the first memory device 81 to a minute electricity, to decrease the electric power consumption while the engine is stopped. Thus, it is possible to eliminate the second memory device 92 of the vehicle door controller 91, to reduce the manufacturing cost of the controller of the vehicle-mounted component.

Modified Embodiments

In the above-described first and second embodiments, the controller for the vehicle-mounted component prevents the opening operation of the vehicle door only when the effective shift position differs from the parking position while the vehicle is parked and the engine is stopped. Alternatively, the controller for the vehicle-mounted component according to the present invention may have an indication/alarm means 85 to notify the driver and/or the passenger of the cause why the vehicle door controller 91 prohibits the opening operation of the vehicle door when the driver and/or the passenger tries to operate the vehicle door.

In the above-described first and second embodiments, the controller for the vehicle-mounted component uses the encoder 7. Alternatively, the rotational direction, the rotational speed, the number of revolutions and the rotational angle of the rotor 11 may be controlled by counting a current supplying number of times to the exciting coils 22 without using the encoder 7.

The above-described controller uses the SR motor as an example of the electric motor 5. Alternatively, the electric motor 5 may be served by other reluctance motors such as synchronous reluctance motors, by permanent magnetic synchronous motors such as surface permanent magnetic synchronous motors (SPM), interior permanent magnetic synchronous motors (IPM), and other kinds of motor.

In the above-described first and second embodiments, the reduction gears 6 are cycloidal gears (inscription engagement planet reduction gears). Alternatively, the reduction gears 6 may be planet reduction gears that is formed from a sun gear 26 driven by the rotor shaft 13, a plurality of planetary pinions arranged around the sun gear 26 at constant intervals, a ring gear engaging with circumferences of the planetary pinions, etc.

In the above-described first and second embodiments, the reduction gears 6 are cycloidal gears (inscription engagement planet reduction gears). Alternatively, the reduction gears may be formed from a combination of a sun gear 26 driven by the rotor shaft 13, a plurality of gears. etc., engaging with the sun gears 26.

In the above-described first and second embodiments, the electric motor 5 and the reduction gears 6 are combined. Alternatively, an output of the electric motor 5 may directly drive a vehicular-mounted component.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A controller for a vehicle-mounted component comprising:
   an automatic transmission that reduces a rotation of an engine and outputs the rotation at an output shaft;
   a shift position detector that detects an effective shift position of the automatic transmission;
   a shift position switching unit that switches the effective shift position of the automatic transmission;
   a parking switching unit that mechanically locks the output shaft of the automatic transmission when the shift position switching unit switches the effective shift position in a parking position; and
   a shift position switching controller that controls the shift position switching unit, a current supply thereto being substantially stopped when the engine is stopped;
   a memory device that memorizes the effective shift position at a timing when the shift position switching controller stops being energized; and
   a vehicle-mounted component controller that prohibits an operation of a vehicle-mounted component when the effective shift position memorized in the memory device is not in the parking position while the current supply to the shift position switching controller is stopped.

2. The controller for a vehicle-mounted component according to claim 1, wherein:
   the vehicle-mounted component is a vehicle door; and
   the vehicle-mounted component controller prohibits an opening operation of the vehicle door when the effective shift position memorized in the memory device is not in the parking position while the current supply to the shift position switching controller is stopped.

3. A controller for vehicle-mounted component according to claim 1, wherein the memory device is incorporated in the vehicle-mounted component controller.

4. A controller for vehicle-mounted component according to claim 1, wherein the memory device is at least one of an EEPROM and a SRAM and incorporated in the shift position switching controller.

5. A controller for vehicle-mounted component according to claim 1, wherein:
   the shift position switching unit has an electric motor to switch the effective shift position of the automatic transmission;
   the shift position detector is an angle sensor that detects a rotational angle of at least one of a rotor and an output shaft of the electric motor; and
   the shift position switching controller controls an operation of the electric motor to switch the effective shift position of the automatic transmission based on the rotational angle detected by the angle sensor.

* * * * *